BEST AVAILABLE COPY

184

M. Whipple.
Rein Holder.
No. 2,541. Reissued Apr. 2, 1867.

Witnesses.
D. L. Trueborn
A. Hormann.

Inventor.
B. B. Hotchkiss

N. PETERS, PHOTO-LITHOGRAPHER, WASHINGTON, D. C.

BEST AVAILABLE COPY

United States Patent Office.

B. B. HOTCHKISS, OF NEW YORK, N. Y., ASSIGNEE OF MILTON WHIPPLE.

*Letters Patent No.* 57,803, *dated September* 4, 1866; *reissue No.* 2,541, *dated April* 2, 1867.

IMPROVEMENTS IN DRIVING-REIN HOLDERS.

The Schedule referred to in these Letters Patent and making part of the same.

TO ALL WHOM IT MAY CONCERN:

Be it known that MILTON WHIPPLE, of Medina, in the county of Orleans, and State of New York, did invent a new and improved Device for Holding Driving-Reins, for which device Letters Patent of the United States were issued to said MILTON WHIPPLE on the fourth day of September, 1866; that said Letters Patent, by a deed of assignment duly executed and recorded, were conveyed to me, B. B. HOTCHKISS, of the city and county of New York, in the State of New York; and that having been advised by counsel learned in the law that said Letters Patent are inoperative and invalid by reason of a defective specification, I have applied to the Commissioner of Patents to issue to me new Letters Patent under an amended specification for said invention, and I do hereby declare that the following is a full, clear, and exact description thereof, which will enable others skilled in the art to make and use the same, reference being had to the accompanying drawings, which form a part of this specification.

Figures 4 and 5 represent the spring detached from the bed-piece.

Similar letters of reference indicate like parts in all the figures.

My invention is designed for holding the driving-reins, as for example whilst the driver temporarily leaves the carriage, or at any time when it is desired to relieve the hands temporarily from the hold on the reins, and consists of a vibrating spring so formed and arranged that the reins may be inserted by an easy movement, and thereby held and prevented from getting under the horse's feet or becoming otherwise entangled. The reins may be inserted instantaneously by one hand alone, and will be held with sufficient tightness to support the weight of the reins and resist the shaking of the same by the animal; but it will yield and allow the reins to slip rather than involve the destruction of the dash-board in case of a stumble of the animal or of a very severe pull occurring from any other cause.

Figure 3:
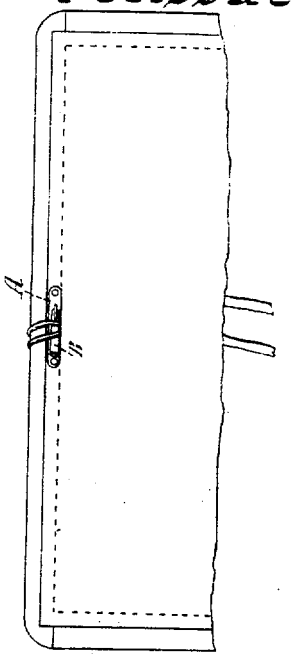
Figure 3 is a perspective view showing the device when in use.
Figure 3:
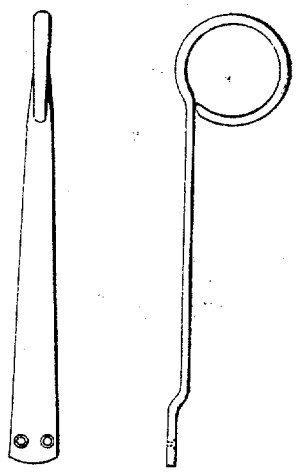
Figure 1:
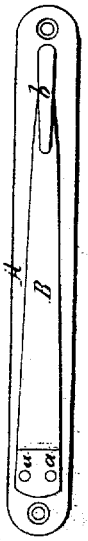
Figure 1 is a front elevation of the device.
Figure 2:
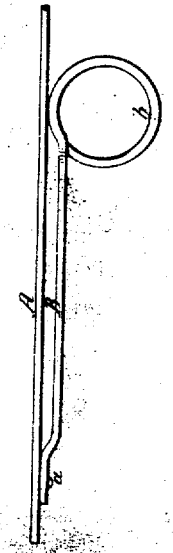
Figure 2 is a top view.

A designates a bed-plate, which may be employed for more conveniently securing the spring. It may be of metal or wood, and of any appropriate form. B is the spring, formed, as represented, of cast-steel well tempered. This may be connected to the bed-plate A at one of its ends in any suitable manner, as shown at *a*, figs. 1 and 2. This spring carries a ring or thumb-piece, *b*, which may be taken hold of, if desired in any case, to more readily insert or withdraw the reins. The form of the parts, however, allows the operation to be effected, as will be readily understood, without such aid, with a moderate outlay of strength, by simply pressing the reins edgewise into or out of the bite of the spring. It is practicable to dispense with the plate A, but I prefer to use it; it makes a more convenient means of securing the device to the carriage, and relieves the carriage from being rubbed by the reins. The spring B alone, or the bed-plate A, on which it may be previously mounted, should be secured to the dash-board of the carriage on the inner side thereof, or that facing the occupant of the carriage, as shown in fig. 3. When it is desired to secure the reins, they are to be drawn under the spring, which can be done by inserting them under the free end of the spring B and drawing them toward the fastening, where they will be held securely.

What I claim as new, and desire to secure by Letters Patent, is—

The spring device herein described, adapted to operate in holding and releasing the driving-reins, substantially in the manner and for the purposes herein specified.

B. B. HOTCHKISS.

Witnesses:

D. L. FREEBORN,

WM. C. DEY.